Jan. 21, 1936.  T. J. SMULSKI  2,028,571
ELECTRIC CONTROL SYSTEM
Filed Oct. 4, 1930
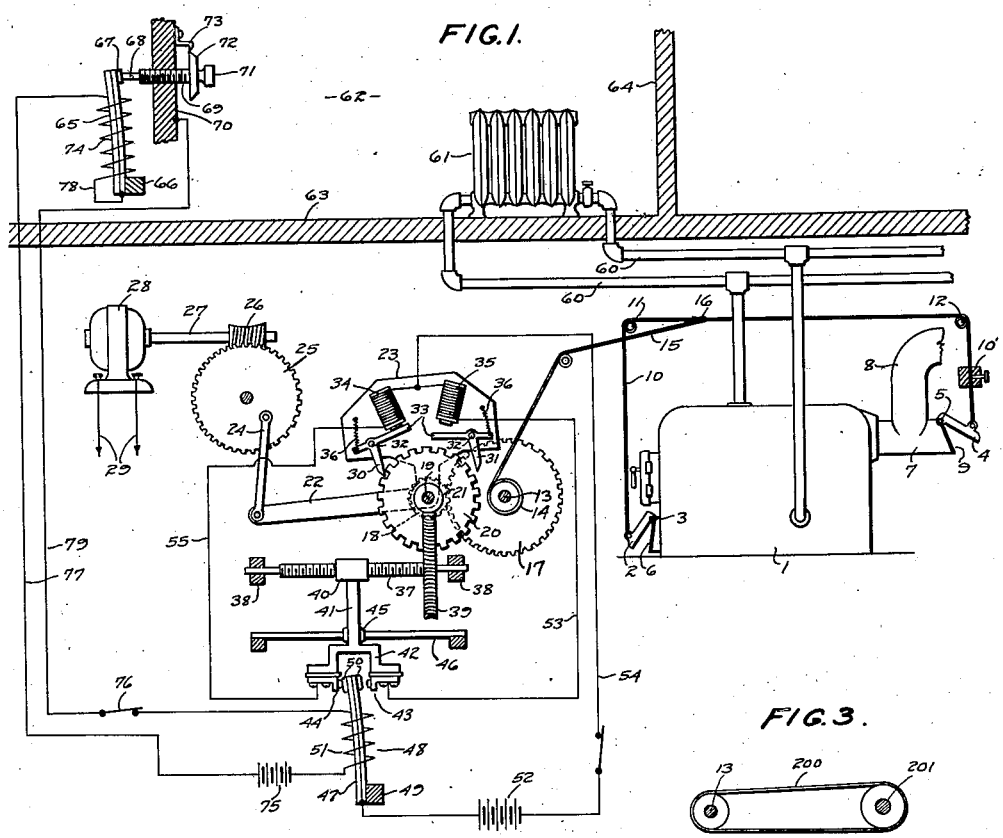
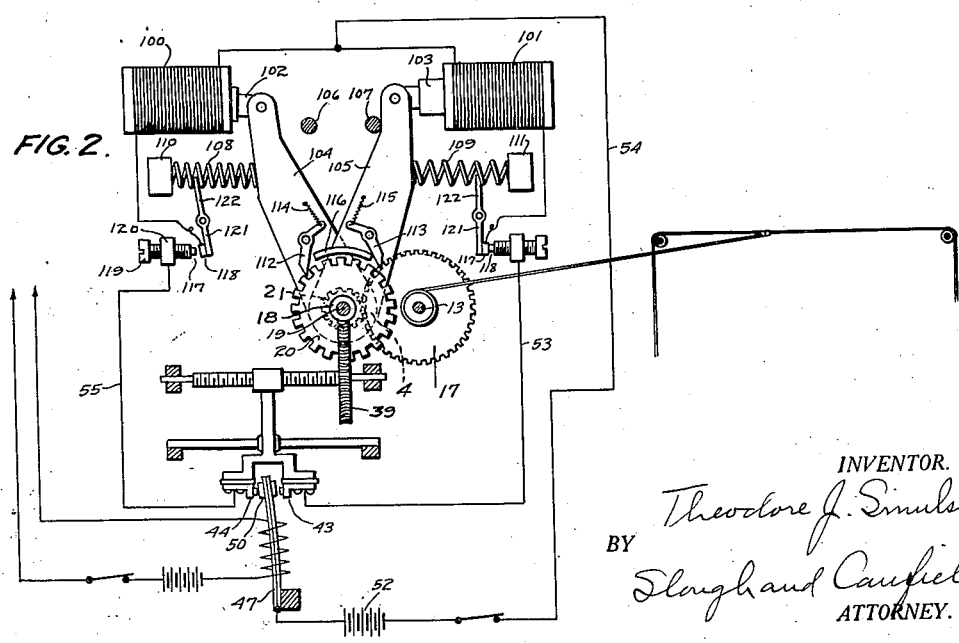
INVENTOR.
Theodore J. Smulski
BY
Slough and Canfield
ATTORNEY.

Patented Jan. 21, 1936

2,028,571

UNITED STATES PATENT OFFICE 2,028,571

ELECTRIC CONTROL SYSTEM

Theodore J. Smulski, Gary, Ind., assignor to The Anderson Company, Gary, Ind., a corporation of Indiana Application October 4, 1930, Serial No. 486,418

7 Claims. (Cl. 236—68)

This invention relates to automatic electric control systems, and particularly to systems for automatically controlling the function, operation, etc. of remotely situated apparatus, machinery, or the like.

My invention is applicable to numerous uses and to the control of various remotely situated types of apparatus in which it may be desired to cause an element of the apparatus having a range of movement to take any of the possible positions within its range.

In this application, however, I have chosen to illustrate and describe the invention as applied to controlling the heating plant for heating the interior of a building to maintain the temperature thereof substantially constant.

Heretofore, the heating plants of buildings have been automatically controlled by systems responsive to changes of temperature at a selected station in the building, to maintain the temperature within upper and lower predetermined limits. Upon attaining the predetermined maximum temperature, the furnace of the plant has been operated to reduce the rate of combustion therein, causing a gradual lowering of room temperature and upon reaching the lower or minimum predetermined temperature, the furnace has correspondingly been operated to increase the rate of combustion therein, thus the temperature of the room heated by the furnace must necessarily vary a number of degrees to effect the regulation of the furnace.

It is one of the objects of this invention to provide a control system responsive to the temperature of the room or rooms being heated which will operate the furnace in a manner to maintain a more nearly constant room temperature than has heretofore been attainable.

Another object is to provide such a control system which will operate to vary the rate of combustion in the furnace in response to exceedingly minute changes of room temperature to maintain the room temperature substantially constant.

Another object is to provide a system of control for heating plant furnaces operable to vary the rate of combustion in the furnace by controlling the position of a draft regulating element of the furnace and in which the said draft regulating element is controlled to take up successively any or all of the possible positions within its complete range of movement.

Another object is to provide a control system for heating plant furnaces of the class referred to in which the draft regulating element may be moved to vary the rate of combustion by minute increments or decrements over a part or all of its range of movement.

Another object is to provide an automatic control system whereby a remotely situated movable element of an apparatus may be caused to take up any of the possible positions within its range of movement in response to temperature changes at a proximate station.

Another object is to provide an automatic electric control system comprising a control element adapted to transmit therefrom over a suitable circuit, electric energy at a rate responsive to and in accordance with changes of a variable factor such, for example, as temperature; and a power supplying element adapted to be actuated by the said energy transmitted thereto; and a remotely situated element of an apparatus adapted to be moved by the power supplying element to take up any or all of the possible positions within its range of movement in response to and in accordance with the rates of energy transmitted to the power supplying element; the movable element of the apparatus being adapted to effect variations of the variable factor.

Other objects will be apparent to those skilled in the art to which my invention appertains.

My invention is fully disclosed in the following description taken in connection with the accompanying drawing, in which:

Fig. 1 is a diagrammatic illustration of an embodiment of my invention;

Fig. 2 is a diagrammatic view similar to Fig. 1 but showing a modification;

Fig. 3 is an elevational view of an arrangement adapting the modifications of Figs. 1 or 2 to the control of a fuel supply valve or the like.

The subject matter of this application is a continuation in part of the subject matter of my pending application Serial No. 468,975, filed July 18, 1930.

Referring to the drawing, I have shown at 1, in simplified form, a furnace of a type commonly employed for heating interiors of buildings, comprising a draft regulating door 2 pivoted to the furnace frame at 3, and a check draft door 4 pivoted at 5. Air for combustion purposes may enter through a doorway 6 and the products of combustion may pass out through a horizontal duct 7 and smoke pipe 8. The duct 7 has a doorway 9 beyond the pipe 8. A chain or cord 10 is connected at one end to the door 2, passes over pulleys 11 and 12 and is connected at the other end to the door 4 and may be provided with a counterbalancing weight 10'.

The construction thus far described is well known. Opening of the door 2 increases the draft and the combustion. Opening the door 4 by-passes the draft and reduces the combustion. By connecting the doors 2 and 4 by the chain 10, upon opening the door 2, the door 4 is correspondingly closed and vice versa.

The parts just described constitute no essential part of my invention and are merely illustrative of one method of controlling the combustion of the furnace, and any movable element or elements other than the doors 2 and 4 which may function to change the rate of combustion of the furnace may be employed.

The furnaces indicated as of the steam or hot water type and by means of pipes 60—60 supply heat to a radiator or like device 61 in a room to be heated, indicated generally at 62, the floor 63 and one wall 64 thereof only being shown.

The following means is provided to move the combustion regulating elements, such as the doors 2 and 4. A shaft 13 has mounted thereon a windlass 14 on which is wound a chain 15 connected at its free end as at 16 to a portion of the chain 10 between the pulleys 11 and 12. On turning the windlass 14 in alternate directions, the doorway 6 will be opened wider and the doorway 9 will be more nearly closed and vice versa.

The shaft 13 has rigidly mounted thereon a gear 17 meshed with a gear 18 rigidly connected to a shaft 19 on which is also rigidly mounted a ratchet wheel 20 and a worm 21. Loosely mounted on the shaft 19 for oscillatory movement thereon is a bell crank comprising a lever 22 and a head 23, the lever 22 being connected by a connecting rod 24 to a crank wheel 25 in the form of a worm gear meshed with a worm 26 on the shaft 27 of an electric motor 28.

The electric motor 28 is preferably of a constant speed type and, upon connecting the supply wires 29 thereof to a suitable source of supply, rotates continuously in one direction and in a well known manner oscillates the lever 22 and thereby the head 23 on the shaft 19.

By means of pawls 30 and 31 adapted to be alternately or selectively engaged with the teeth of the ratchet wheel 20, the ratchet wheel 20 may, by the oscillatory movement of the head 23, be stepped ahead notch at a time in either direction to rotate the shaft 19 in either direction and, through the gears 18 and 17 and the windlass 14, move the draft doors in corresponding directions.

The pawls 30 and 31 are pivotally mounted on the head 23 as at 32—32 and are provided with magnetic armatures 33—33 disposed so as to be attracted by electro-magnets 34 and 35 on the head 23, and the pawls 30 and 31 are normally retracted out of engagement with the ratchet wheel 20 by springs 36.

Upon energization of either magnet 34 or 35 the corresponding pawl 30 or 31 is drawn into engagement with the teeth of the ratchet wheel 20 for the purpose above mentioned.

A screw 37 mounted for rotation in bearings 38—38 has rigidly connected thereto a worm wheel 39 meshed with the worm 21. The screw 37 is also provided with a traveling nut 40 threaded thereon, which has a depending arm 41 on the lower end of which is a forked contact carrying member 42 supporting electric contacts 43 and 44 suitably spaced apart. Rotation of the shaft 19 by the ratchet wheel 20 rotates the worm wheel 39 and screw 37 and moves the traveling nut 40 to shift the contacts 43—44 in the direction of travel of the nut 40 and the movement of the contacts and of the nut 40 is guided by a slide bearing 45 on the arm 41 and a stationary longitudinal guide 46 parallel with the screw 37.

The direction of the thread of the worm 21 and of the screw 37 is chosen so that when the shaft 19 is rotated counterclockwise as viewed in Fig. 1, the contacts 43 and 44 will be moved toward the left.

Indicated generally at 48 is a thermostatic device comprising a bi-metallic thermo-responsive element 47 rigidly connected at one end to a stationary support 49, and carrying on its free end a contact 50. An electric heating element 51 has heat supplied thereto in a manner to be described in accordance with the temperature of the room 62, which, according to the well known properties of bi-metallic thermo-responsive elements, causes the element 47 to bend, to the left or to the right as viewed in Fig. 1, to engage the contact 50 with the contact 43 or 44. Engagement of the contact 43 will energize the magnet 35, current flowing from a battery or other suitable source 52, through the bi-metallic element 47, contacts 50 and 43, and by a wire 53 to and through the magnet 35 and by wire 54 back to the source. Engagement of the contact 44 will correspondingly energize the magnet 34 through a wire 55 instead of the wire 53, as in the case of the magnet 35. An increase in the temperature of the element 47 effected by the heating element 51, will cause it to become more bent or bend to the left and move the contact 50 into engagement with the contact 44, whereupon the magnet 34 will be energized, the shaft 19 will be rotated counter-clockwise, and the contact 44 will be moved toward the left and break contact at 44—50. Correspondingly, a decrease in the temperature of the element 47 will engage the contacts 50—43, energizing the magnet 35 and resulting in a movement of the contact 43 toward the right and out of engagement with the contact 50.

The means for supplying heat to the thermo-responsive element 47 will now be described. In the room indicated at 62, a bi-metallic thermo-responsive element 65 is fixed at one end as at 66, and on its other end carries the contact 67, movable in response to the bending movement of the element 65. A stationary contact 68 on the end of the screw 69, threaded into a stationary support 70, may be engaged by the contact 67. The screw 69 may be adjustably rotated to adjust the position of the contact 68 by means of a knob 71 and a dial 72 on the screw. The dial 72 may be graduated in degrees to indicate desired room temperature and a stationary pointer 73 may indicate temperature adjustments of the dial. Associated with the bi-metallic element 65 is an electric heating coil or other electric heating means 74. Preferably the heating element 74 is connected in series with the heating element 51 of the bi-metallic element 47 and current is supplied thereto by a source of supply, such as a battery 75.

In operation, upon closure of a control switch 76, current may flow from the battery 75 by wire 77, through the heating element 74, by wire 78, through the bi-metallic element 65, as a conductor to the contacts 67—68, support 70, wire 79, switch 76 and through the heating element 51 back to the battery 75. The current thus flowing heats the bi-metallic element 65, causing it to bend sufficiently to break the contact 67—68 and interrupt the current flow. The element 65 then cools down and again closes the contact 67—68. Thus the repeated closing and opening of the contact 67—68 sends a series of current impulses to the heating element 51. The construction of the heating element 51 and bi-metallic element 49 and associated parts is, by well known means such as to provide a predetermined amount of heat storage capacity or thermal inertia so that the element 47 is brought up to a substantially constant temperature by the current impulses and so that for a series of impulses of uniform duration and intervals between impulses, the element 47 will remain substantially immovable and the contact 50 thereon will take a substantially stationary position.

The bi-metallic element 65 and its heating winding 74 are designed with very low thermal inertia so that the contact 67 will be moved toward and from the contact 68 upon slight changes of temperature of the element 65.

Furthermore, the element 65 will be thermally responsive to temperature derived from the room 62 in which it is situated, as well as from the heating element 74 thereon.

Upon a change of temperature in the room 62 however slight it may be, the temperature of the element 65 will be correspondingly changed thereby. If the room temperature falls, the temperature of the element 65 will accordingly fall and current in the heating element 74 must flow for a longer period before the element 65 will be heated to the temperature at which it will break the contact 67—68. As a result, the current impulses will be of longer duration and the amount of heat supplied to the heating element 51 will be greater and the element 47 and contact 50 will correspondingly take up new positions farther to the left, as described above. The converse action will result if the temperature of the room 62 rises.

Furthermore, as will now be clear, by adjusting the position of the contact 68 by the knob 71 and dial 72, the duration of the impulses sent out by the contacts 67—68 may be adjustably varied, because if the contact 68 be adjusted closer to the contact 67 by turning the dial 72 to indicate a lower temperature, the element 65 must be heated to a higher temperature before it can break the contact 67—68, which results in longer current impulses sent to the heating element 51.

From the foregoing description it will now be clear that a minute change of temperature in the room 62 will effect a change in the duration of the impulses of current caused by the continuous making and breaking of the contact 67—68, and effect a corresponding change in the amount of heating of the element 47 and a change in the position of the contact 50. For example, if the room 62 becomes slightly cooler, the contact 50 will engage the contact 44, resulting in a ratcheting counter-clockwise of the ratchet wheel 20 and an accompanying opening of the draft door 2 to increase the combustion and raise the temperature of the room 62. The counter-clockwise movement of the ratchet wheel 20 also effects a movement of the contact 44 away from the contact 50, whereupon the ratcheting of the wheel 20 stops and the bell crank lever 22 and head 23 idly oscillate on the shaft 19. If the action just described does not sufficiently raise the temperature of the room 62, the element 47 will continue to bend toward the left and again close the contact 44—50, still further increasing the combustion of the furnace and again breaking the contact 44—50. When the room 62 attains the desired temperature, the contact will remain intermediate of the contact 43—44 and the furnace doors will remain stationary in their attained positions. If the temperature in the room 62 rises above the desired value, the contact 50 will move over toward the right and engage the contact 43, resulting in a movement of the furnace doors in the direction for reducing the rate of combustion, and effect movement of the contact 43 away from the contact 50. If the temperature of the room 62 remains constant, the contact 50 will remain in an intermediate position between the contacts 43 and 44. Thus the furnace doors 2 and 4, except for the brief moment during which they are moving, remain in the necessary position to maintain a rate of combustion just sufficient to maintain the room temperature substantially constant, and this position may be anywhere within the total range of movement of the doors.

The necessary change of temperature of the element 47 to move the contact 50 from its mid-position between the contacts 43 and 44 into engagement with one or the other thereof may be effected by an exceedingly slight change of temperature in the room 62. Thus the system and apparatus of my invention operates with a far greater degree of sensitiveness to changes of room temperature than prior systems in which a thermo-responsive element such as a bi-metallic element moves directly in response to changes of room temperature to engage one or the other of a pair of contacts between which the bi-metallic element is situated. In such systems, the room temperature must change sufficiently to cause the bi-metallic element to move from engagement with one contact out of engagement therewith and into engagement with the other contact before the regulating element of the system can be brought into action. In the system and apparatus of my invention above described, it will be observed that a very minute change in room temperature will effect a change in the heating of the element 47, and that this may be made sufficient to cause it to move from the mid-position which it normally occupies into engagement with one or the other of the contacts 42—43.

In the modification of my invention shown in Fig. 2, the continuously rotating motor is not employed and a pair of solenoid type magnets 100 and 101 selectively determine the direction of rotation of the ratchet wheel 20 and also supply the power for turning it.

The plungers 102 and 103 of the solenoids are connected respectively to rocker arms 104 and 105 oscillatable on the shaft 19. The rocker arms are normally held in retracted positions against stops 106 and 107 by springs 108 and 109 compressed respectively between the rocker arms and stationary abutments 110 and 111.

Pawls 112 and 113, respectively, are pivotally mounted on the arms 104 and 105, and by springs 114 and 115 engaging the pawls and anchored on the arms, rotate the pawls 112 and 113 toward engagement with teeth of the ratchet wheel 20.

A shield or cam 116 is disposed between the pawls 112 and 113 and adjacent the periphery of the ratchet wheel 20 and the cam 116 and pawls are constructed and arranged so that, upon movement of the rocker arms to their retracted positions, the pawls 113 and 112, which move bodily with the arms, are deflected or raised out of engagement with the ratchet wheel 20, and upon movement of the arms 104 and 105 from their retracted positions, the pawls enter the teeth of the ratchet wheel 20.

The windings of the solenoid magnets 100 and 101 are energized by circuits identical with those described in connection with Fig. 1, except that the circuit wires 53 and 55 leading from the contacts 43 and 44 to the windings 101 and 100, respectively, have interposed therein, in each case, a set of contacts 117—118, the contact 117 being mounted on an adjusting screw 119 threaded in a stationary post 120, and the contact 118 being mounted on a pivoted lever 121, an arm of which as at 122, is projected between convolutions of the spring 108 or 109. Movement of the spring 108 or 109 to retract the rocker arm 104 or 105 communicates movement to the lever 121 to resiliently close the contacts 117—118, and movement of the rocker arms from the retracted position opens the contact 117—118.

In view of the more complete description of Fig. 1, a brief description of Fig. 2 will suffice to explain its operation.

When the contact 50 is midway between the contact 43—44, both of the arms 104 and 105 are in their retracted position in which the arm 105 is illustrated. Upon movement of the contact 50 into engagement with the contact 44, current flows from the battery 52 through the element 47, contact 44—50, wire 55, through the contacts 117 and 118 which at that time are closed, and through the solenoid 100 back to the battery by wire 54, energizing the solenoid 100 and rocking the arm 104 counter-clockwise. Upon movement of the arm 104, the pawl 112 rides off of the cam 116, engages teeth of the ratchet wheel 20 and rocks the shaft 19 counter-clockwise, the movement of the arm 104 compresses the spring 108 and communicates movement to the lever 121 and breaks the contact 117—118. This de-energizes the solenoid 100, and the spring 108 retracts the arm 104 to its original position.

The return movement closes contact 117—118 and the arm is again oscillated. Thus the arm 104 vibrates with an oscillatory movement, successively engaging the pawl 112 with teeth of the ratchet wheel 20 and continuously stepping the ratchet wheel around counter-clockwise until the contact 44 has been moved out of engagement with the contact 50. Thereupon the arm 104 is retracted against the stop 106 and remains in that position. Arm 105 is operated in a similar manner upon engagement of the contact 43 by the contact 50. The stepping up of the ratchet wheel 20 by the arms 104 and 195 as just described, operates the draft doors as described in connection with Fig. 1.

From the foregoing description, it will be apparent to those skilled in this art that my invention is applicable to the regulation and control of room temperature in other ways than by regulating the draft of the heat supplying furnace. For example, the regulation may be effected by controlling the rate of fuel supply to the furnace, as, for example, in the case of gas and oil fired furnaces. In such installations, the shaft 13 may be belted or geared or otherwise connected to the fuel supply valve. In Fig. 3 is indicated such an arrangement, the belt or chain being indicated at 200 and the shaft or stem of a valve of the rotary type being indicated at 201.

Also, as stated hereinbefore, my invention is not limited to the control of heat supplying apparatus and is adaptable to many diverse uses wherein it may be desired to move with a controlling and regulating movement, a movable element of an apparatus in response to variations of a variable factor such as temperature. With particular reference to the forms of the embodiments of my invention illustrated and described hereinbefore, such movable element of an apparatus may be moved to take up any of its possible positions within a range of movement by connecting it with suitable power transmitting means to the shaft 13.

My invention is not limited to the exact details of the mechanism diagrammatically illustrated now of the system of electrical connections therefor hereinbefore shown and described. Many changes therein and modifications thereof may be made within the scope and spirit of my invention without departing therefrom and without sacrificing its advantages.

I claim:

1. In an automatic control system for an apparatus adapted to supply heat at a point of use, a movable element of the heat supplying apparatus adapted to vary the heat output thereof in accordance with its position in a range of movement, a source of power for moving the movable element, thermo-responsive means for effecting successive initiation and interruption of the application of power to the said movable element and selectively controlling the directions of movement of the movable element by said power to cause it to take up successive determined positions within its range, an electric heater for the thermo-responsive means, and means for gradually varying the current in said heater to vary the heating effect thereof responsive to corresponding gradual changes of temperature at the point of use.

2. In an automatic control system for an apparatus adapted to supply heat at a point of use, a movable element of the heat supplying apparatus adapted to vary the heat output thereof in accordance with its position in a range of movement, a source of power for moving the movable element, means for successively initiating and interrupting the application of power to said movable element and for selectively controlling the direction of movement of the movable element by said power to cause it to take up successive determined positions within its range, said means comprising a pair of electrically actuated means, controlling circuits therefor and a contact controlling each circuit and a thermo-responsive means movable to selectively engage said contacts and selectively energize the circuit, and means to shift said contacts to de-energize the selectively energized circuit upon movement of the movable element to a new position, an electric heater for heating the thermo-responsive means, a source of current, a circuit for the heater and an electric controller responsive to gradual variations of temperature at the point of use for gradually variably supplying heating current to the heater.

3. In an electric control system and apparatus adapted to supply heat at a point of use, a movable element of the heat supplying apparatus adapted to vary the heat output thereof in accordance with its position in a range of movement, a source of power for moving the movable element, means for successively initiating and interrupting the flow of power from said source to said movable element and for selectively controlling the direction of movement of the movable element by said power to cause it to take up successive determined positions within its range, said means comprising a clutch engageable element, a head continuously oscillatable by said source of power and provided with a pair of clutch engaging elements, a pair of electrically actuated means for selectively engaging the clutch engaging elements with the clutch engageable element, electric circuits and a pair of contacts for selectively energizing said electrically actuated means, a thermo-responsive means movable to selectively engage said contacts in response to variations of temperature thereof, and adapted to selectively energize the said circuits, means for shifting said contacts in the direction to disengage the selectively engaged contacts upon movement of said movable element to a new position, a heating element for the thermo-responsive means and a circuit and source of supply therefor and a controller responsive to gradual changes of temperature at the point of use adapted to correspondingly gradually vary the supply of current to the electric heater.

4. In an electric control system and apparatus adapted to supply heat at a point of use, a movable element of the heat supplying apparatus adapted to vary the heat output thereof in accordance with its position in a range of movement, a source of power for moving the movable element, means for successively initiating and interrupting the flow of power from said source to said movable element and for selectively controlling the direction of movement of the movable element by said power to cause it to take up successive determined positions within its range, said means comprising a pair of electrically actuated devices and a circuit and a contact for each controlling selectively the energization thereof, means adaptable upon the energization of either device to selectively periodically interrupt its energizing circuit and to exert a succession of moving efforts on the movable element in one direction of movement thereof, the thermo-responsive means for selectively connecting said circuit-contacts to a source of supply, and means for shifting said contacts to deenergize the selected electrically actuated device upon movement of the movable element to a new position, said thermo-responsive means comprising an electric heating element, a circuit, and a source of supply therefor, and a controller responsive to gradual changes of temperature at the point of use adapted to correspondingly gradually vary the supply of current to the heating element.

5. A modulating system comprising, electromotive means movable in opposite directions, a pair of contacts positioned thereby, cooperative contact means engageable with either of said pair of contacts, two energizing circuits for said electromotive means, each of which is controlled by one of said pair of contacts and the cooperative contact means to cause selective movement of the electromotive means, a thermally-responsive means for variably positioning said cooperative contact means within its range of movement, electric heating means for said thermally-responsive means, and an energizing circuit for said heating means including an element responsive to variations in physical condition at a predetermined point for variably affecting the heating effect of said heating means to variably position the thermally-responsive means within its range of movement in accordance with variations in said physical condition.

6. In an electric control system and apparatus, an element of the apparatus movable within a range of movement, a source of power for moving the movable element, thermo-responsive means effecting successive initiation and interruption of the application of power to said movable element and selectively controlling the direction of movement of the movable element by said power to cause it to take successive determined positions within its range, a heater for the thermo-responsive means, and means for supplying to the heater successive discontinuous quantities of heat variable in amount and frequency responsive to variations of a variable factor controllable by the position of said movable element.

7. A modulating system comprising electromotive means movable in opposite directions, a pair of contacts associated therewith, cooperative contact means engageable with either of said pair of contacts, two energizing circuits for said electro-motive means, each of which is controlled by one of said pair of contacts and the cooperative contact means to cause selective movement of the electro-motive means, electro-responsive means for variably positioning said cooperative contact means within its range of movement, coil means associated with and adapted to actuate said electro-responsive means, and an energizing circuit for said coil means including an element responsive to variations in physical conditions at a predetermined point for varying the current through said coil means to variably position the electro-responsive means within its range of movement in accordance with variations of said physical condition.

THEODORE J. SMULSKI.